United States Patent [19]

Brown et al.

[11] 4,208,803

[45] Jun. 24, 1980

[54] TOP VIEWABLE VIAL LEVEL

[75] Inventors: Martin M. Brown, Kensington; Sylvester W. Bies, Bloomfield, both of Conn.

[73] Assignee: The Stanley Works, New Britain, Conn.

[21] Appl. No.: 60,015

[22] Filed: Jul. 23, 1979

[51] Int. Cl.² ............................................. G01C 9/32
[52] U.S. Cl. ........................................ 33/348; 33/379
[58] Field of Search ......................... 33/348, 379, 381

[56] References Cited

U.S. PATENT DOCUMENTS

| | | | |
|---|---|---|---|
| 3,835,549 | 9/1974 | De Jong et al. | 33/379 |
| 4,011,660 | 3/1977 | Johnson | 33/379 |

FOREIGN PATENT DOCUMENTS 559325  2/1944  United Kingdom ..................... 33/348

*Primary Examiner*—Charles E. Phillips
*Attorney, Agent, or Firm*—Prutzman, Kalb, Chilton & Alix

[57] ABSTRACT

Improved mounting means is provided for mounting a top viewable liquid vial in a level having an I-beam type frame provided with a through opening in the web communicating with a notch in the adjacent horizontal working surface, the mounting means including a transparent shroud for the vial having a bight portion extending around the vial below the notch forming a magnifying lens and side walls forming side windows protecting the vial. The shroud is clamped between a pair of identical mounting caps which also are clamped to the web around the periphery of the through opening thereby enclosing the shroud and vial assembly and positioning it in the through opening to permit viewing of the vial from the top and sides.

6 Claims, 4 Drawing Figures

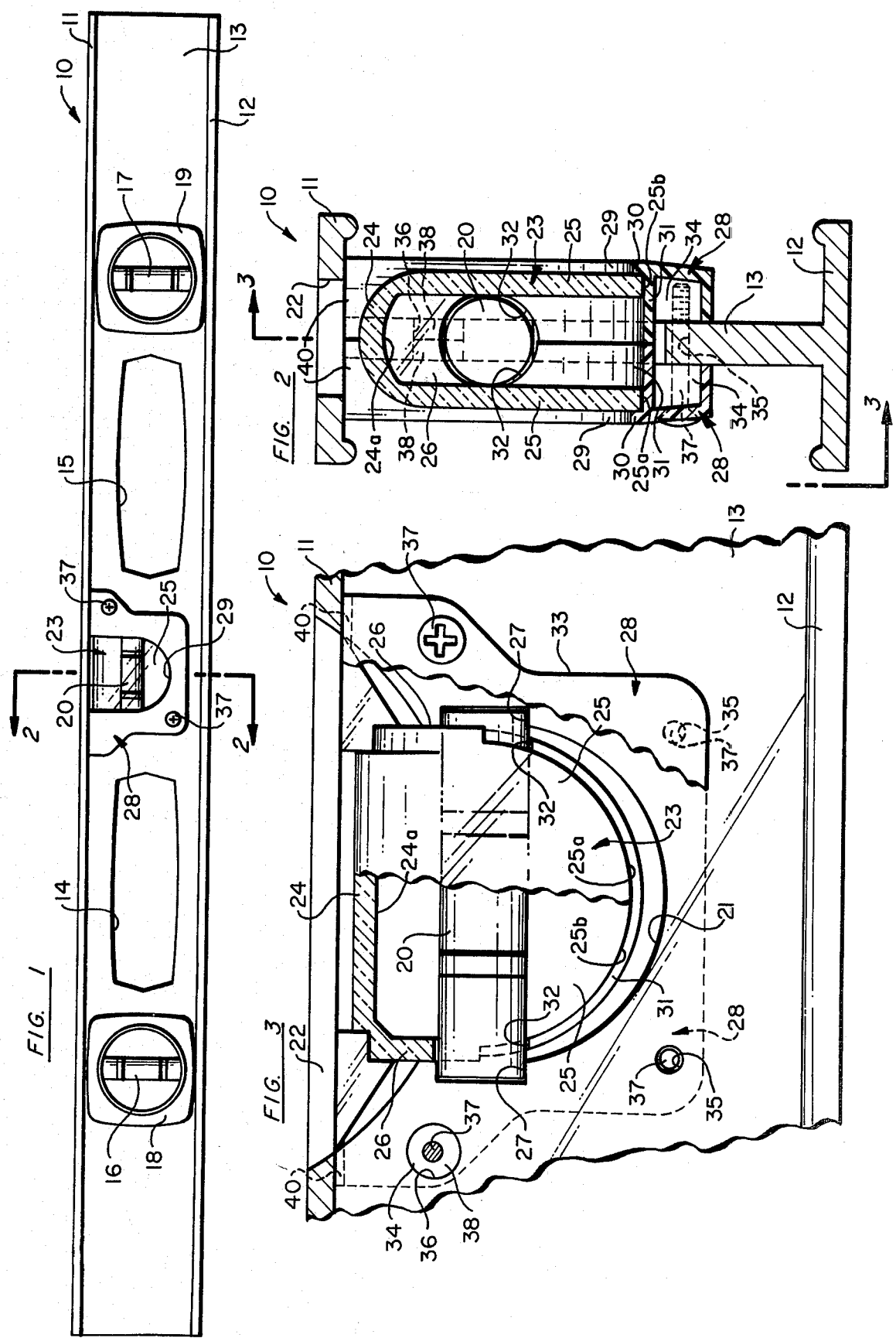

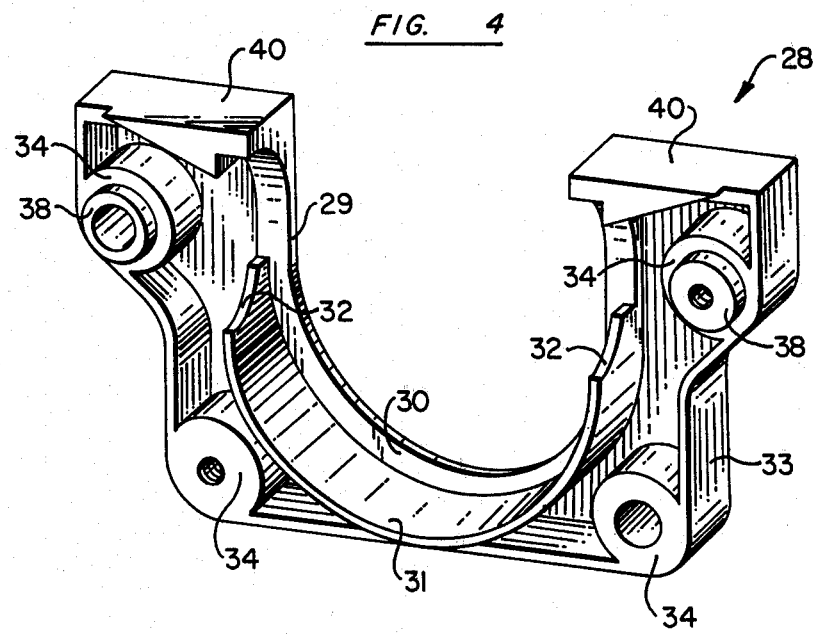

TOP VIEWABLE VIAL LEVEL

The invention relates to liquid vial levels of the type used by carpenters, masons and similar artisans and is particularly concerned with an improvement in levels of this type in which a liquid vial is mounted in the level so that it is viewable from the top as well as the sides.

A level of the type to which the present invention pertains is disclosed, for example, in prior U.S. Pat. No. 3,835,549 issued Sept. 17, 1974 and owned by the assignee of the present invention. As shown in that patent, a level of the I-beam type has a liquid vial which can be viewed from the top as well as the sides inasmuch as the vial is mounted in an opening in the web of the I-beam which communicates with a notch in the adjacent upper working surface. A problem with such levels is that they are frequently used under very adverse conditions such as at construction sites which increases the possibility of breakage and may cause the vial markings to be difficult to see particularly when dust or chips obscure the vial.

The present invention is intended to overcome these disadvantages by providing an improved mounting for the liquid vial which includes a transparent shroud in the shape of a saddle which overlays the vial and which has a convexly bight portion recessed below the adjacent working surface of the level and made thicker at the center than at the sides to provide a magnifying lens, the shroud and vial assembly being seated in an opening in the web of the level and supported therein by suitable mounting caps which enclose the periphery of the shroud and adjacent portions of the web.

An advantage of this construction is that the liquid vial is protected at the top and both sides with a transparent covering that tends to shed dust and chips which impinge thereon, and which provides an apparent enlargement of the vial in the transverse direction when viewed from the top. It also concentrates the light on the vial to provide improved visibility of the bubble in the vial without causing distortion of the axial position of the bubble. A further advantage is that the protective shroud is extremely durable and positioned in a protected position so that it will maintain its transparency under adverse conditions of use. Another advantage is that the improved mounting is simple and economical to fabricate and assemble while at the same time presenting an improved and attractive appearance.

The details of the invention will be described in connection with the accompanying drawing of a specific embodiment of the invention, in which:

FIG. 1 is a side elevation of a level having a top viewable liquid vial mounted in accordance with the invention;

FIG. 2 is an enlarged cross-sectional view taken along the line 2—2 of FIG. 1;

FIG. 3 is an enlarged fragmentary side view of the level with the shroud and a mounting cap for the top viewable liquid vial being partially cut away to show the interior structure, and;

FIG. 4 is a perspective view of the inner face of one of the apertured side mounting caps.

Referring to the drawings, the invention is embodied in a level 10 of I-beam configuration having two parallel working surfaces provided by the flanges 11 and 12, the flanges being connected by the intermediate web 13. In the preferred embodiment, the level is fabricated from light weight metal and is cut away at 14 and 15 to reduce the weight and also provide hand grips. Adjacent the ends of the level, there are mounted two liquid vials 16 and 17 which extend vertically as viewed in FIG. 1, the vials 16 and 17 being mounted in openings having their borders covered by the apertured cover plates 18, 19. The mounting and placement of the liquid vials 16, 17 are in accordance with the known art and do not form a part of the present invention.

The top viewable liquid vial 20 is mounted in accordance with the invention in a through opening 21 in the web 13 which communicates with a notch 22 in the flange 11 which is the top flange as viewed in FIGS. 1 and 3 of the drawing.

As best shown in FIGS. 2 and 3, the mounting for the vial 20 includes a transparent shroud 23 of clear plastic or other material which is in the form of a saddle of U-shaped cross-section inverted over the vial 20 with its bight portion 24 above the top surface of the vial. The shroud 23 is dimensioned so that vial 20 fits snugly between the two depending side walls 25 of the shroud which have rounded lower edges 25a and 25b that form protective side windows through which the vial 20 may be viewed when the assembly is completed.

As best shown in FIGS. 2 and 3, the arcuate lower edges of end walls 26 of the shroud 23 are seated against the top of the vial 20 so that the vial 20 is spaced a short distance below the bight 24. It also will be noted that the vial 20 is slightly longer than shroud 23 so that the ends protrude slightly for engagement in the notches 27 in the web 13 of the frame at opposite edges of the through opening 21. These notches 27 are precisely machined and dimensioned so that when the ends of the vial 20 are positioned therein, the vial will be accurately aligned with and parallel to the working surfaces of flanges 11 and 12.

As best shown in FIG. 2, the inside surface 24a of the bight portion 24 of the shroud 23 is semi-circular in contour and can be of the same radius or larger, as the outside surface of bight portion 24, provided its radius center is below the radius center of the outer surface of bight portion 24, thereby forming a longitudinal section between bight surfaces 24 and 24a which is thicker thru the center than at the edges. A longitudinally extending magnifying lens causing transverse enlargement of the vial 20 is formed when vial 20 is viewed therethrough.

As best shown in FIGS. 2, 3, and 4, the assembly comprising the vial 20 and shroud 23 is held in place in the through opening 21 by a pair of identical mounting caps 28 secured to opposite sides of the web 13. Each cap has a U-shaped aperture 29 open at the top and bounded at its inner lower edge by a generally semi-circular rim 30 and an adjoining flange 31 dimensioned to form a close-fitting seat for the rounded lower edge of the adjacent side wall 25 of the shroud 23. The flange 31 is formed with notches 32 at either side to accommodate the protruding ends of the vial 20 and to seat the end walls 26 of the shroud 23.

As best shown in FIGS. 2 and 3, when both mounting caps 28 are in place, the upper flanges 40 of the mounting caps 28 abut against the underside of the level top flange 11 adjacent the notch 22 and cover the end side walls 26 of the shroud 23 while the rounded bight portion 24 is exposed in registry with but below the notch 22. At the same time the outer wall 33 of each of the mounting caps 28 and the bosses 34 are clamped against the web 13 at the periphery of the through opening 21. The flange 31 also abuts and covers the bottom edge of the side wall 25 of the shroud 23. Holes 35 and 36 are provided in the web 13 to accommodate screws 37 by means of which the mounting caps 28 are clamped together against the shroud 23 and vial 20 assembly and against the web 13. The upper holes 36 are enlarged to receive abutting projections 38 on the upper bosses 34 which aid in accurately positioning the mounting caps 28.

When the assembly is completed, it will be seen that the vial 20 is completely enclosed at its top and sides by the transparent shroud 23 which in turn is enclosed and sealed by the mounting cap 28. Thus the vial 20 is protected from contact with moisture or dirt as well as from breakage. The shroud surfaces through which the vial 20 is viewed are all recessed so as to minimize scratching or other damage and the bight 24, in addition to providing helpful magnification of the vial 20 so as to render it more visible, also provides a self-cleaning effect since dust and chips, etc., tend to slide off its rounded surface rather than to accumulate thereon. In addition, the mounting is simple and economical to fabricate and assemble, being comprised of only three parts, in addition to the vial and screws, with two of the parts being duplicates.

As will be apparent to persons skilled in the art, various modifications, adaptations and variations of the foregoing specific disclosure can be made without departing from the teachings of the present invention.

We claim:

1. In combination with a level having an I-beam type frame provided with parallel flanges and an interconnecting web having a through opening communicating with a notch in an adjacent flange, a liquid vial and mounting assembly therefor, said mounting assembly comprising a transparent shroud in the form of a saddle of U-shaped cross-section having a bight portion extending around the vial below the notch and depending side walls forming side windows protecting the vial, and a pair of mounting caps secured to the web and clamping the web around the periphery of the through opening, said mounting caps having flanges extending around the periphery of the shroud and having edge portions clamping the peripheral edge of the shroud and means to secure said vial to said web for viewing from above said flange and from either side of said web.

2. The combination defined in claim 1 wherein the bight portion of the shroud is thicker at the center than the adjacent side edges thereby forming a magnifying lens.

3. The combination as defined in claims 1 or 2, wherein the bight portion of the shroud is mounted inwardly of the flange of the level.

4. The combination as defined in claims 1 or 2 wherein the two mounting caps are duplicates and interchangeable.

5. The combination as defined in claims 1 or 2 wherein the shroud is formed with end walls adjacent the bight portion, said end walls having curved edges seated against the ends of the vial with the vial in spaced relation to the bight portion, the vial being longer than the shroud whereby the ends of the vial protrude outwardly from the end walls of the shroud for engagement in positioning notches in the web of the level frame.

6. In combination with a level having an I-beam type frame provided with parallel flanges and an interconnecting web having a through opening communicating with a notch in an adjacent flange, a liquid vial and mounting assembly therefor, said mounting assembly comprising a transparent shroud in the form of a saddle of U-shaped cross-section having a bight portion extending around the vial below the notch and depending side walls forming side windows protecting the vial, and a pair of mounting caps secured to either side of the web around the periphery of the through opening and securing the shroud and said vial to said web for viewing from above said flange and from either side of said web.

* * * * *